Sept. 30, 1941.    C. J. COBERLY    2,257,107
CENTRIFUGAL SEPARATOR
Filed Aug. 13, 1937    3 Sheets-Sheet 2

INVENTOR
CLARENCE J. COBERLY
BY
HARRIS, KIECH, FOSTER & HARRIS
ATTORNEYS.

Patented Sept. 30, 1941

2,257,107

UNITED STATES PATENT OFFICE 2,257,107

CENTRIFUGAL SEPARATOR

Clarence J. Coberly, Los Angeles, Calif., assignor to Roko Corporation, Reno, Nev., a corporation of Nevada Application August 13, 1937, Serial No. 158,932

12 Claims. (Cl. 210—63)

My invention relates to centrifugal separator devices, and more particularly to such devices as may be employed to separate a solid, a liquid, or a gas from a liquid.

The invention is of particular utility in the oil industry where it may be used to separate undesirable solids and liquids from oil pumped from a well, and, accordingly, the invention will be described in connection with such use, although it is to be understood that it may have other equally valuable applications and that I do not intend to be limited to the embodiment and specific applications thereof described.

In the oil industry it is found that oil which is pumped from a well ordinarily contains solid particles of foreign substances and considerable quantities of water mixed therewith or emulsified therein and gas, which may be classified as foreign substances. It is frequently desirable to utilize at least a portion of such pumped oil at or near the site of production, for example, to operate a fluid operated deep well pump, as described in my Letters Patent No. 2,046,669, issued July 7, 1936. Water, gas, and solid particles of foreign substances in the oil are undesirable in the operation of such fluid operated pumps and, accordingly, it is a primary object of my present invention to provide a device which may be used to separate foreign substances from a fluid. I prefer to accomplish this by providing a filter mechanism utilizing centrifugal force to separate solid particles and water of such foreign substances from the fluid treated, and which is supplied with a gas separating device for removing at least a portion of the gas from such fluid.

It is a further object of my invention to supply a centrifugal filter mechanism as described above having means for cleaning the filter bed thereof as desired without dismantling the device.

Another object of my invention is to provide a centrifugal filter having a rotatable filter chamber, power means for rotating the chamber, and a valve for automatically exhausting the filter chamber when the power is shut off.

A still further object of my invention lies in the provision of a novel valve structure adapted to be actuated by the inertia of one or more of the elements thereof.

A further object of the invention is to supply a centrifugal filter device adapted to receive the entire production flow of fluid from a well, including means for diverting and filtering at least a portion of said production flow, and means for separating at least a portion of the gas from said production flow.

Another object of the invention is to provide a device for separating gas from a fluid.

Still another object of my invention is to provide a centrifugal filter for removing undesirable substances from a fluid, in which means are provided for periodically cleaning the filter bed of the filter.

It is another object of the invention to provide a centrifugal filter in which liquid to be filtered is caused to move through the filter bed thereof with a viscous flow while separating foreign materials from the liquid and with a turbulent flow when reversed through the filter bed, so that foreign materials in the filter bed are stirred up and carried out of the filter by such reverse flow.

Another object of the invention is to supply a centrifugal filter having a filter bed in which the dimension between filter surfaces measured parallel to the lines of centrifugal force is small so that the clarifying capacity will be high without the use of a large centrifugal force.

A still further object of my invention is to provide a centrifugal filter having a filter bed comprising a plurality of concentric cylindrical surfaces having perforations therein spaced apart a distance less than the distance between adjacent surfaces, so that with the normal angle of repose sediment will discharge outwardly through the perforations before the spaces between adjacent cylindrical surfaces are obstructed thereby.

A further object of my invention is to provide a separating device adapted to separate gas from a fluid in which means are provided for maintaining the amount of gas in the device below a predetermined maximum.

A still further object of my invention is to supply a separating device adapted to separate gas from a fluid in which the gas collecting in said device is automatically released therefrom when the amount of said gas increases above a predetermined maximum.

Another object of the invention is to provide a novel gas valve and oil valve structure, for controlling the pressure in the system, including a master valve and a pilot valve adapted to actuate the master valve.

Another object of my invention is to provide a separating device adapted to separate gas from a fluid, in which means are afforded for maintaining the amount of gas in the device above a predetermined minimum.

A further object of my invention is to supply a valve means which includes a main valve and a pilot valve adapted to actuate the main valve, the pilot valve being operable in accordance with fluid pressure operating thereon.

Still another object of the invention is to provide a valve means including an automatically operable main valve adapted to clean itself during operation.

Another object of the invention is to supply a valve means having an automatically operable main valve and a manually operable means for manually actuating the main valve.

Other objects and advantages will appear from the specification, claims, and drawings, in which:

Figure 1:
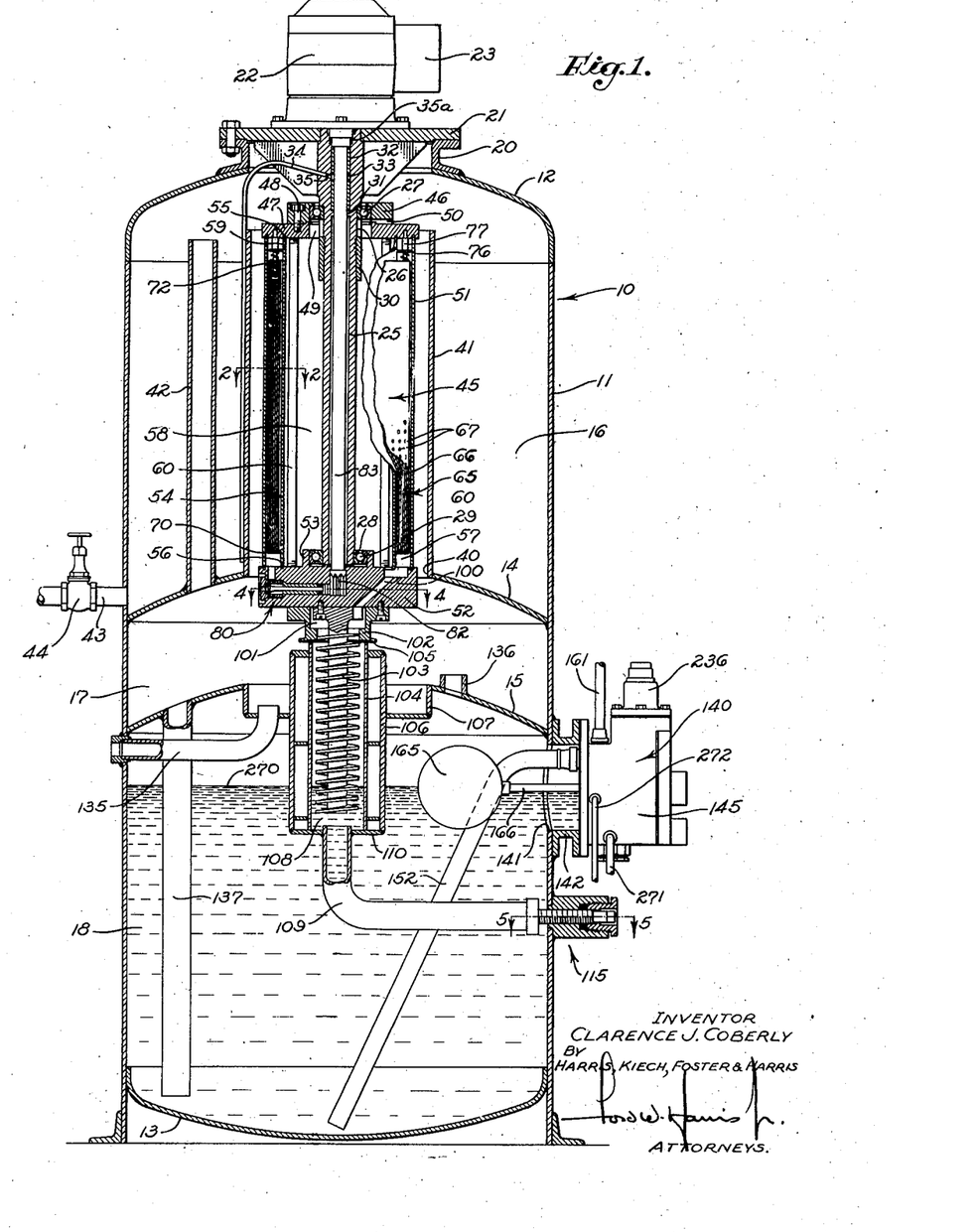
Fig. 1 is a vertical view, partly in section, of the invention.

Referring to Fig. 1, a filter tank 10 is provided, having a cylindrical side wall 11, a top member 12, and a closed bottom member 13. The tank 10 has an upper baffle 14 and a lower baffle 15, dividing the tank into an upper storage chamber 16, a central chamber 17, and a lower production chamber 18. Suitably secured to the top 12, or formed integrally therewith, is a flange 20 supporting a top plate 21 bolted or otherwise rigidly secured thereto. An electric motor 22 constituting a power means is carried by the top plate 21 and is provided with a timing mechanism 23 which may be of any suitable design, as is well known in the art. The timing mechanism 23 is adapted to shut off periodically electric energy supplied to the motor 22, as will be described hereinafter, and it will be obvious to those skilled in the art that any other appropriate power source may be substituted for the motor without departing from my invention.

Depending from the top plate 21 is a tubular member 25, rigidly fixed thereto, having an upper reduced diameter portion 26 adapted to receive the inner race of a thrust bearing 27, and having a lower reduced diameter portion 28 adapted to receive the inner race of a radial bearing 29. An outer sleeve 30 is threadedly received on the tubular member 25 to fix the inner race of the thrust bearing 27 relative to the tubular member. The tubular member 25 is provided with an internal annular shoulder 31 which is engaged by a sleeve bearing 32 having an annular channel 33 therein which communicates with a lubrication pipe 34, one end of which projects into the space 16, and the other end of which projects into a drilled hole 35 in the tubular member. The lubrication pipe 34 will become filled with clean oil from the upper chamber 16, which is conducted therethrough into the annular channel 33 from whence it moves downwardly to lubricate a rod 83. The upper end of the tubular member 25 is provided with packing 35a around the rod 83 to prevent upward escape of material quantities of oil from the annular channel 33. As will be pointed out later herein, the upper chamber 16 is normally filled with clean oil and gas under pressure above it, and I have found that it is difficult to form a satisfactory seal between the rotating rod 83 and the tubular member 25 if gas is allowed to leak up therebetween. By providing clean oil in the annular channel 33 by means of the lubrication pipe 34, I substitute oil for the gas which would otherwise escape therefrom, and find that I can more effectively seal off the oil by means of the packing 35a than would be possible with gas. Consequently, the structure just described has the dual function of providing lubrication for the rod 83 and at the same time substituting a liquid seal for the gas seal which would normally be required, both of which are features of the invention.

The upper baffle 14 has a central opening 40 therein, and is provided with a cylindrical wall 41 which extends upwardly to terminate below the thrust bearing 27. As shown, the pipe 34 extends downwardly outside the cylindrical wall 41 to a point which is always below the surface of the liquid in the chamber 16. The upper baffle is also provided with a stand pipe 42 which extends upwardly therefrom to a point just below the upper end of the cylindrical wall 41, and which communicates with the central chamber 17 at its lower end. A clean fluid pipe 43 is connected through the wall 11 to the upper chamber 16 and has a suitable valve 44 therein.

Supported on the thrust bearing 27 is a filter means 45 which I utilize to remove foreign materials from the fluid to be treated, as described hereinafter. The filter means 45 has an upper bearing plate 46 rotatably supported on the bearing 27, to which an upper end element 47 is secured preferably by bolts 48, the inside diameters of the bearing plate and end element being spaced from the tubular member 25 and the outer sleeve 30 to form a space 49 therebetween. Radial passages 50 spaced between the bolts 48 directly connect the space 49 and the upper chamber 16.

Received in suitable channels in the upper end element 47 and depending therefrom is an outer tubular filter shell 51, the lower end of which is received in a lower end member 52, the lower end member having an annular shoulder 53 journalling the outer race of the lower bearing 29. An inner cylindrical shell 54 is received in channels 55 and 56 of the upper and lower end members 47 and 52, respectively, and is spaced from the outer tubular shell 51 to form a filter space 57 and a storage space 58. The inner shell 54 is provided with a plurality of openings 59 at the upper end thereof affording communication between the filter space 57 and the storage space 58. A plurality of tie rods 60 connect the upper and lower end elements 47 and 52 and function to hold the end elements in alignment. By tightening the tie rods 60, fluid-tight joints are formed between the outer and inner tubular shells 41 and 51 and the upper and lower end members 47 and 52, between which suitable gaskets may be provided if desired.

Figure 2:
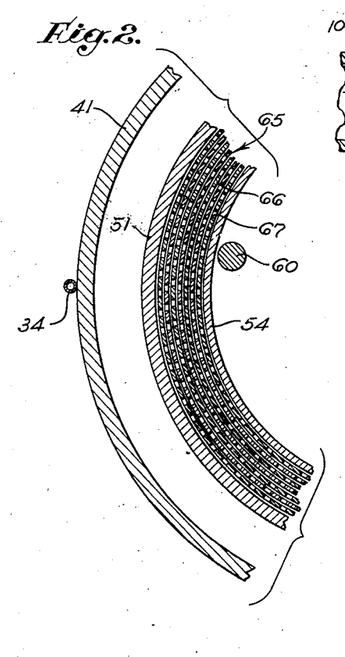
Fig. 2 is an enlarged sectional view taken on the line 2—2 of Fig. 1.
Figure 3:
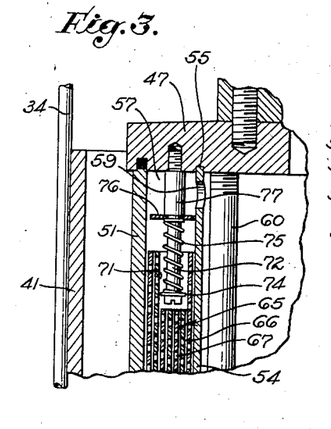
Fig. 3 is an enlarged sectional view of a portion of the filter bed assembly.

Positioned in the filter space 57 is a filter bed element 65, which, as shown in Figs. 1, 2, and 3, is formed of a plurality of superimposed layers 66 having holes 67 therein. Although the layers 66 may be of any desirable material and may be in the form of concentric tubes if desired, for the sake of simplicity I prefer to form the filter bed element 65 by rolling up to the desired size a single sheet of metal having the holes 67 punched therein. The holes 67 are spaced a distance apart such that the angle of repose of filtered foreign materials adhering to the layers 66 between the holes will be sufficient to cause such materials to pass through the holes without obstructing the spaces between adjoining layers. In practice, I prefer to make the layers 66 as thin as possible without undue sacrifice of mechanical strength, and in actual use the space between adjacent layers is preferably from five to eight times the thickness of the layers, so that maximum capacity is obtained.

The filter bed element 65 is supported on an annular plate 70 secured to the inner wall 54 and substantially fills the filter space 57 as shown in Fig. 1. In the upper end of the filter element 65 a plurality of recesses 71 are formed so as to receive bolts 72 threaded into the upper end element 47. Each of the bolts 72 carries a washer 74 supporting a coil spring 75 surrounding each bolt, the springs supporting an annular closure plate 76 which circumscribes the inner wall 54 and partially closes the upper end of the filter space 57 and, more particularly, closes the upper ends of the spaces between the layers 66 of the filter element 65. The bolts 72 are provided with an enlarged upper portion 77 forming a shoulder limiting upward movement of the closure plate 76, the coil springs 75 permitting downward movement of the plate on the application of pressure to the upper surface thereof but normally maintaining the plate in its uppermost position as shown in Figs. 1 and 3. The purpose of the closure plate construction will be described hereinafter.

Figure 4:
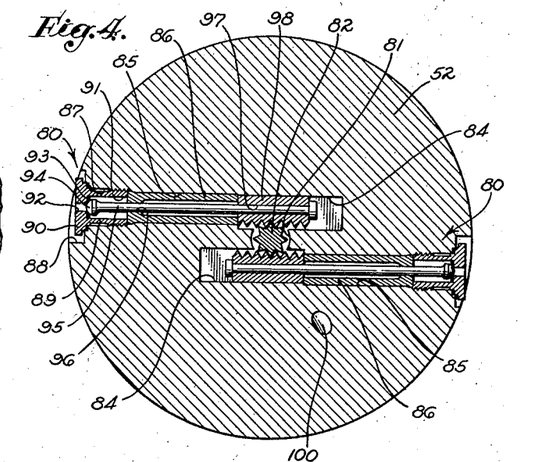
Fig. 4 is an enlarged sectional view taken on the line 4—4 of Fig. 1.

The lower end element 52 is provided with valve means 80 adapted to permit the filter space 57 to be flushed as desired. As shown in Figs. 1 and 4, the lower end element 52 is provided with a central opening 81 adapted to receive a pinion 82 fixed or integrally formed on the rod 83 operatively connected to the motor 10 so as to be rotated thereby. The rod 83 extends upwardly through the tubular member 25 and is rotatably journalled in the bearing 32. Actuation of the motor 10 causes the rotation of the rod 83 and pinion 82. Formed in the lower end element 52 and intersecting the opening 81 are twin cavities 84, each of which communicates with a passage 85 having a sleeve member 86 therein. The valve means 80 are identical in construction, and, accordingly, only one will be described. An outer opening 87 is formed in the outer surface of the lower end element 52, having an enlarged recessed portion 88 and axially aligned with the passage 85. A valve member 89 is threadedly received in the outer opening 87 so as to hold the sleeve 86 in place in the passage 85 and has a head 90 which engages the inner concentric annular surface of the recessed portion 88. The valve member 89 has a central bore 91 and a valve opening 92 communicating between the bore and the upper end of the central chamber 17, as shown in Fig. 1. At the inner end of the valve opening 92 is a valve seat 93 adapted to receive a valve head 94 adapted to close the valve opening, the head preferably being semispherical in shape so as to extend into the valve seat and form a tight connection in the opening. The valve head 94 is formed on a rod member 95 which extends inwardly through the bore 91, through an opening 96 in the sleeve member 86, and through the sleeve member, slidably extending through an opening 97 in a rack 98 positioned in the central cavity 84. The rack 98 engages the pinion 82 and is adapted to move in the central cavity 84 to unseat the valve head 94, as described hereinafter.

The lower end element 52 is also provided with an outwardly and upwardly extending passage 100 communicating at its upper end with the filter space 57 and at its lower end with a chamber 101 formed by a flange element 102 suitably secured to the lower surface of the lower end element. Fixed to the lower end element 52 in the chamber 101 is a spiral screw 103 which depends therefrom and which is adapted to function as a pumping means in the invention. The screw 103 is enclosed in a tubular member 104 which extends upwardly into close proximity to the lower face 105 of the flange 102 and which is supported by a cylindrical housing 106 carried by a recessed annular tray 107 fixed on the lower baffle 15. The tubular member 104 and the housing 106 form an inlet chamber 108 adapted to receive fluid through a pipe 109 passing through the bottom plate 110 of the housing.

Figure 5:
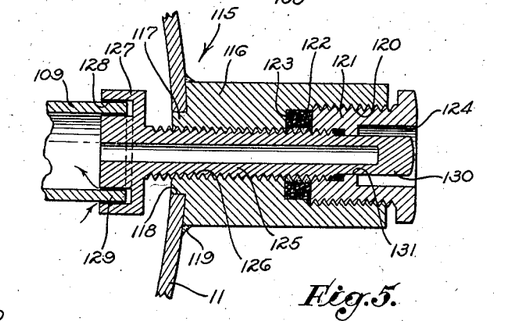
Fig. 5 is an enlarged sectional view taken on the line 5—5 of Fig. 1.

A manually operable valve mechanism 115 is connected to the outer end of the pipe 109, as shown in detail in Fig. 5, and may be operated to control the passage of fluid to the filter element 45 through the pipe 109. Although any suitable valve mechanism may be employed without departing from the invention, I prefer to use a valve mechanism including a hub element 116 having a projection 117 inset in an opening 118 in the side wall 11, the hub making a fluid-tight joint with the side wall and being secured thereto as by welding at 119. The hub 116 is provided with a threaded bore 120 threadedly receiving a screw plug 121 adapted to compress packing 122 in a packing gland 123 in the hub, and has a wrench clearance hole 124 in the outer end thereof. A valve element 125 is threadedly received in an axially threaded opening 126 in the hub 116 and has a valve head 127 on its inner end provided with an annular channel 128 adapted to fit over the outer end 129 of the pipe 109. The outer end 130 of the valve element 125 is of reduced diameter and passes through an opening 131 in the hub and into the socket 124, being so formed as to fit a socket wrench insertable in the socket. By the application of a suitable socket wrench to the outer end 130, the valve element 125 may be screwed in or out to vary the size of the opening between the head 127 and the outer end 129 of the pipe 109 to control the amount of fluid flowing into the pipe from the lower chamber 18.

As shown in Fig. 1, a fluid supply pipe 135 extends through the side wall 11 and extends upwardly into the tray 107, the outer end of the supply pipe being connected to a supply pipe line from a source of fluid to be treated, not shown. The lower baffle 15 is provided with a short communication pipe 136 which affords open communication between the upper end of the lower chamber 18 and the central chamber 17, and is provided with depending tubing 137 communicating between the central chamber and the lower end of the lower chamber.

Figures 6, 7:
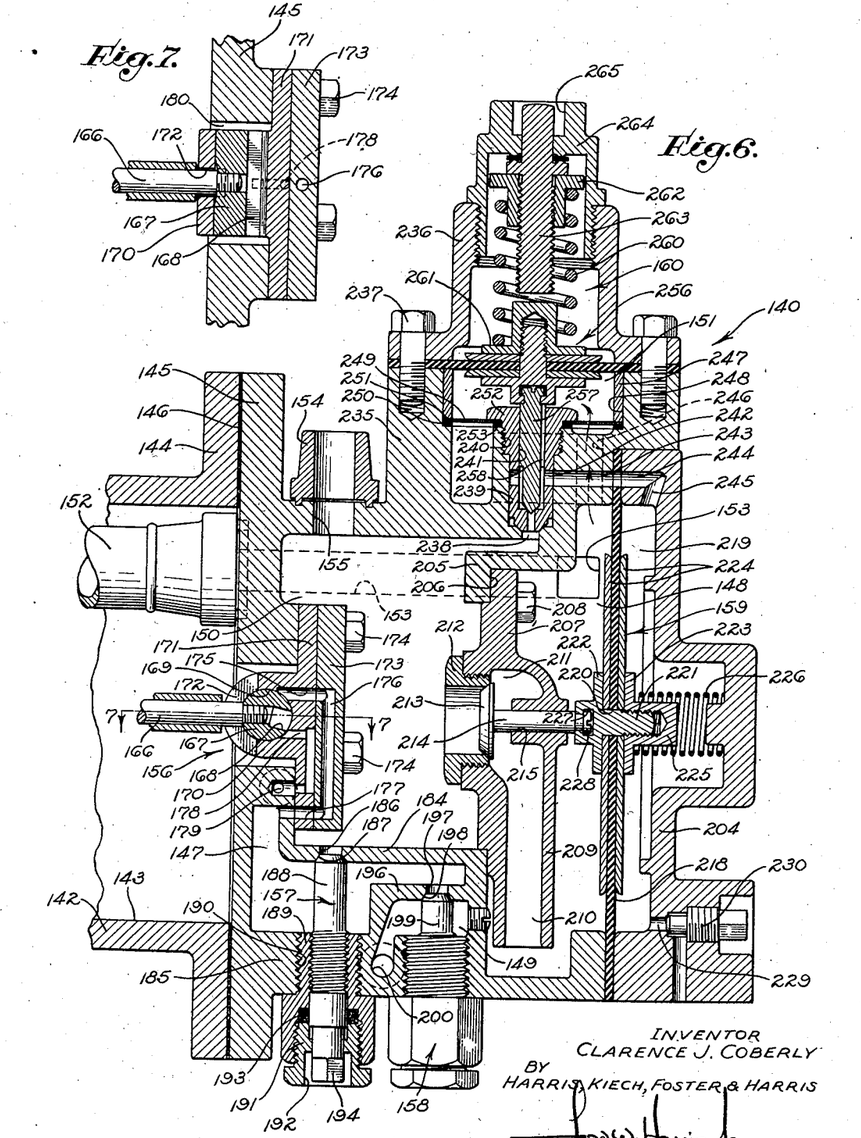
Fig. 6 is an enlarged vertical sectional view of the valve mechanism of my invention.
Fig. 7 is a sectional view taken on the line 7—7 of Fig. 6.

Secured to the side wall 11 of the device is a back pressure valve means 140 which is shown in detail in Figs. 6 and 7. The side wall 11 has an opening 141 therein, a collar member 142 being suitably secured to the side wall and having a bore 143 therethrough communicating with the opening and an outer collar plate 144 formed thereon. Rigidly secured to the outer face of the collar plate 144 is a valve housing 145, being separated therefrom by a gasket 146 so as to form a fluid-tight joint between the housing and the collar plate.

The valve housing 145 is preferably of cast metal and is formed so as to provide a gas inlet chamber 147, a fluid inlet chamber 148, a gas discharge chamber 149, a fluid discharge chamber 150, and a pilot valve chamber 151. A fluid inlet pipe 152 extends from the bottom of the lower chamber 18, passes through the opening 141 in the side wall 11 and the bore 143 of the collar 142, and is connected to the inner face of the housing 145 so as to communicate with an inlet passage 153 formed in the housing and leading into the fluid inlet chamber 148. A production flow pipe 154 communicates through a production discharge opening 155 formed in the housing 145 with the fluid discharge chamber 150 and may be connected to suitable piping 161 for conveying the fluid discharged therethrough to a suitable point of storage or disposal, not shown.

The valve housing 145 contains a gas valve means 156, gas discharge valve means 157 and 158, a main valve 159, and a pilot valve 160.

The gas valve means 156 includes a ball float 165 positioned in the lower chamber 18 of the filter tank 10 which floats on any liquid therein. A rod 166 is suitably secured at one end to the ball float 165 and at the other end is threaded into a solid cylindrical section 167 having a transverse horizontal slot 168 formed therein. The section 167 is journalled in an opening 169 formed in a boss 170 of an inner valve plate 171, the rod 166 extending through a vertical slot 172 formed in the boss, so that the section may be rotated in the boss around a horizontal axis. An outer valve plate 173 registers with the inner valve plate 171, the two plates being secured to the inner wall of the valve housing 145 by bolts 174 or other appropriate fastening means. An upper passage 175 in the boss 170 and inner valve plate 171 communicates with a vertical passage 176 in the outer valve plate 173, which in turn communicates through a lower passage 177 in the inner plate with the gas inlet chamber 147. The upper passage 175 communicates with the transverse slot 168 when the section 167 is rotated in a counter-clockwise direction. A central passage 178 is also formed in the inner plate 171 and communicates between the transverse slot 168 when the section 167 is rotated in a clockwise direction and an orifice 179 formed in the housing 145 leading to a gas-inlet pipe 272 connected to the housing. Gas may enter the transverse slot 168 through the space 180 between the section 167 and the housing 145, as shown in Fig. 7.

The gas discharge valve means 157 includes the gas inlet chamber 147 formed by a wall 184 of the housing 145 and the bottom wall 185 of the housing. An opening 186 is formed in the wall 184 so as to communicate between the gas inlet chamber 147 and the fluid discharge chamber 150, and has a beveled seat 187 adapted to receive the tapered end of a valve element 188. The valve element 188 is threadedly received in a journalling member 189 which is in turn threaded into an opening 190 in the bottom wall 185. The outer end of the journalling member 189 is recessed to receive a screw plug 191 having a socket 192 therein and adapted to compress a packing gland 193 having suitable packing therein. The valve element 188 extends through the packing gland 193 and the screw plug 191, having its outer end 194 formed to receive a suitable socket wrench adapted to fit into the socket 192. The packing gland 193 forms a fluid-tight fit between the valve element 188 and the elements through which it passes, and by the application of a socket wrench to the outer end 194 thereof the opening 186 may be opened or closed.

The gas valve means 158 includes the gas discharge chamber 149 formed by a wall 196, a portion of the wall 184, and the bottom wall 185 of the valve housing 145. An orifice 197 is provided in the wall 196 and has a beveled seat 198 adapted to receive the tapered end of a valve member 199. The valve member 199 and associated mechanism is preferably similar to the valve element 188 of the gas discharge valve means 157 and operates in the same way to open or close communication between the gas inlet chamber 147 and the gas discharge chamber 149. An opening 200 is provided in the valve housing 145 communicating with the gas discharge chamber 149 and is adapted to conduct gas therefrom to storage or use by suitable piping 271.

The main valve 159 includes the fluid inlet chamber 148 and has a cover plate 204 closing the end of the valve housing 145, being rigidly secured thereto in any desired manner. A depending wall 205 formed on the housing 145 provides a shoulder 206 which is engaged by a seat member 207 which also engages the wall 184 to separate the central cavity of the housing into the fluid discharge chamber 150 and the fluid inlet chamber 148. The seat member 207 is appropriately secured to the housing 145, as by bolts 208, so as to form a fluid-tight joint therewith, and is provided with a depending tubular member 209 having a passage 210 therein extending to a point near the bottom of the fluid inlet chamber 148. The seat member 207 also has a central cavity 211 formed therein threadedly receiving a main valve seat member 212 adapted to seat a main valve head 213 formed on a valve rod 214 passing through a journalling opening 215 in the seat member.

Clamped between the valve housing 145 and the cover plate 204 is a major diaphragm 218 formed of resilient material such as, for example, rubber, which forms a resilient outer wall for the fluid inlet chamber 148 and forms an inner resilient wall for a fluid pressure chamber 219 formed in the cover plate. The diaphragm is provided with a central opening 220 through which extends a screw 221 formed on an inner clamp member 222 and which is threadedly received in an outer clamp member 223. Clamped between the inner and outer clamp members 222 and 223 and the major diaphragm 218 is a pair of circular plates 224 adapted to stiffen the diaphragm. The outer clamp member 223 is provided with a hub 225 centering a coil spring 226 which engages the clamp member and the cover plate 204, tending to force the diaphragm 218 to the left as seen in Fig. 6. The inner clamp member 222 is provided with a T-slot 227 adapted to receive a head 228 formed on the outer end of the valve rod 214, which permits ready assembly of the main valve 159. Communicating with the fluid pressure chamber 219 is a passage 229 having a manually operable bleeder valve member 230 therein which may be utilized as hereinafter described to manually actuate the main valve 159. It will be apparent that movement of the major diaphragm 218 will be communicated to the main valve head 213 to open or close the main valve.

The pilot valve 160 includes the pilot valve chamber 151 formed by a boss 235 on the valve housing 145, and a cap 236 secured thereto by any convenient means, such as bolts 237. A pilot opening 238 communicates with the fluid discharge chamber 150 and has therein a valve seat member 239 threaded into the valve housing at 240. The seat member 239 has a longitudinal bore 241 and lateral openings 242 and an annular ring 242a communicating through a passage 243 in the valve housing 145, a hole 244 in the major diaphragm 218, and a passage 245 in the cover plate 204, with the fluid pressure chamber 219. A pressure passage 246 in the valve housing 145 affords open communication between the pilot valve chamber 151 and the fluid inlet chamber 148. A sleeve 247 fits into a bore 248 in the valve housing 145 and holds the outer edge of an annular screen 249 in engagement with an outer washer 250 resting on a shoulder 251 provided by the end of the bore 248. A head 252 formed on the valve seat member 239 clamps the inner edge of the screen 249 in engagement with an inner washer 253.

Clamped between the cap 236 and the boss 235 is a minor diaphragm unit 256 which is similar to the diaphragm mechanism of the main valve 159 but smaller in size, having a valve element 257 connected thereto which extends through the longitudinal bore 241 of the valve seat member 239 and is adapted to seat therein. The valve element 257 has a longitudinal slot 258 therein which affords fluid communication at all times between the pilot valve chamber 151 and the fluid pressure chamber 219 through the lateral opening 242 and annular ring 242a, the passage 243, the hole 244, and the passage 245.

A compression spring 260 is provided in the cap 236 so as to bear against the upper face 261 of the minor diaphragm unit 256, there being a flange nut 262 riding on a screw 263 which projects through a closure member 264 into a wrench socket 265. By application of a suitable socket wrench to the outer end of the screw 263 and rotation thereof, the flange nut 262 may be moved up or down on the screw, thus increasing or decreasing the compressive force exerted by the spring 260 on the minor diaphragm unit 256.

Operation of the invention is as follows:

Fluid to be treated flows into the filter tank 10 through the fluid supply pipe 135, fills up the tray 107, and flows down over the lower baffle 15 in a thin layer and into the lower chamber 18 through the depending tubing 137. As the fluid to be treated flows down over the lower baffle 15, gas which may be normally mixed or dissolved in the fluid may be liberated, which gas collects in the central chamber 17 and in the upper chamber 16 and builds up a gas pressure in the filter tank above the liquid level 270 therein. The upper, central, and lower chambers 16, 17, and 18, respectively, are in open gas communication through the stand pipe 42 and the communication pipe 136. When operation of the device is commenced, the liquid level 270 normally rises until the gas pressure thereabove prevents further rise of the level, at which time liquid starts to flow from the lower chamber 18 through the fluid inlet pipe 152 into the back pressure valve means 140.

At approximately the same time that fluid commences to flow into the filter tank 10 through the supply pipe 135, the electric motor 22 is energized, causing rotation of the rod 83 and the pinion 82 in a counter-clockwise direction. Rotation of the pinion 82 causes the rack 98 to travel to the left, as seen in Figs. 1 and 4, leaving the valve 80 free to close, and the valve head 94 seats in the valve seat 93 due to the action of centrifugal forces acting thereon by reason of the rotation of the end member 52. When the rack 98 engages the inner end of the sleeve 86, the lower end member 52 rotates with the pinion as a unit. Such rotation of the lower end member 52 causes rotation of the entire filter means 45 and the spiral screw 103 connected to the end member. The valve mechanism 115 is opened by the application of a suitable wrench to the outer end 130 of the valve element 125, so as to permit liquid in the lower chamber 18 to enter the pipe 109, and the rotating spiral screw 103 acts as a pump to force fluid upwardly in the tubular member 104, into the chamber 101 of the flange element 102, and into the outwardly and upwardly extending passage 100. Rotation of the lower end member 52 causes the passage 100 to act as an auxiliary pumping means to force liquid into and upwardly in the filter space 57. The liquid flows upwardly in the filter space 57 between the layers 66 in predominantly a vertical path, the rate of flow thereof being too low to carry foreign materials contained therein which are heavier than the liquid to the upper end thereof. The foreign materials, such as solid particles and heavy liquids, are propelled radially by centrifugal force during their upward passage between the layers 66. The solid particles adhere to the inner surfaces of the layers 66 or the tubular wall 51 and stick thereto by centrifugal force or their inherent adhesive characteristics and build up to their angle of repose between the holes 67 on the layers, which may be approximately 40°, and any further particles then pass outwardly through the holes to adhere finally to an outer layer or to the inner surface of the tubular wall. It will thus be understood that the solid particles have to move radially only a short distance before striking and adhering to either the layers 66 or the tubular wall 51, and consequently an efficient filtration is accomplished without the necessity of using a large centrifugal force, which is an important feature of the invention. It will be understood also that after the solid particles of foreign material have built up to their angle of repose between the holes 67 in the layers 66, sufficient space still exists between adjacent layers for the upward passage of liquid, any additional particles passing outwardly through the holes.

When the storage space 58 is filled with filtered liquid, the excess of liquid then flows upwardly through the space 49 and out the radial passage 50. The rotation of the filter element 45 causes the liquid discharging from the radial passage 50 to be thrown clear of the cylindrical wall 41 into the upper chamber 16 where it collects and may be withdrawn as desired through the clean fluid pipe 43 by adjustment of the valve 44. The filtered fluid level in the upper chamber 16 cannot rise above the upper end of the stand pipe 42, any excess clean liquid discharging downwardly through the stand pipe into the central chamber 17 where it mixes with the fluid therein. Any filtered liquid which works up between the rod 83 and the tubular member 25 and through the bearing 32 collects in the channel 33 and is discharged through the leakage pipe 34 back into the central chamber 17, thus protecting the motor 22 and preventing leakage.

An important feature of the invention lies in the provision of means for periodically cleaning the filter bed 65 during operation. When it is desired to clean the filter bed 65, the motor is de-energized, preferably by the timing mechanism 23 which may be set to shut off the flow of electric current to the motor at stated intervals, such as once a minute, although it will be evident that this may be accomplished manually without departing from the spirit of the invention. When the motor 22 is de-energized, the inertia of the rotating filter element 45 then drives the motor, but the racks 98 are then free to move outwardly away from the sleeve members 86. As will be seen in Fig. 4, the racks 98 centrifugally balance each other, but each rack when in its extreme position toward its sleeve member 86 is slightly unbalanced so that when the motor 22 is de-energized, centrifugal force will cause each rack to move away from its sleeve member, and since each rack engages the shoulder formed on the outer end of the valve stem 95, the valve stem is carried with the rack to unseat the head 94 from its seat 93 to open the valve members 80. Since centrifugal force tends to maintain the valve head 94 in seated position on the seat 93, the rack 98 and valve stem assembly must be carefully proportioned so that the centrifugal force acting on the rack is greater than the force tending to keep the valve closed and the friction of the parts. By carefully proportioning the parts, the valve means 80 will automatically open when the motor 22 is de-energized and automatically close when the motor is re-energized. When the valve means 80 opens, liquid in the filter space discharges therethrough into the central chamber 17, carrying with it solid particles collected in the filter bed element 65. Since the filter element 45 continues to rotate after the head 94 unseats, centrifugal force on the liquid in the storage space 58 causes it to reverse its flow through the openings 59 and downwardly through the filter bed element 65, thus augmenting the flushing action of the fluid passing therethrough. When such a liquid flow occurs through the openings 59, it impinges on the annular closure plate 76 to force it downwardly against the action of the coil springs 75 into engagement with the upper end of the filter bed element 65, thus causing the liquid to flow downwardly in the filter space 57 around the filter bed element and preventing a substantial flow through the element. Since the bulk of the filtered foreign material occupies the space between the filter bed element 65 and the tubular wall 51, most of the foreign material is removed when the filter space 57 is flushed as described. After the motor 22 has been de-energized for a sufficient period of time to permit a thorough flushing and cleaning of the filter bed element 65, such as, for example, two to ten seconds, the motor is again energized, which causes the valve means 80 to close, centrifugal force causing the valve head 94 to seat on the valve seat 93, and the filtering then resumes as described. By flushing the filter bed element 65 at frequent intervals, it is maintained clean and substantially free from particles of foreign matter which would otherwise collect therein and, in due course, contaminate the filtered fluid flowing into the upper chamber 16.

The amount of liquid drawn from the lower chamber 18 and filtered in the filter element 45 may be regulated by adjustment of the valve means 115. In some instances, for example, when my invention is utilized to treat the production flow from an oil well, the fluid flowing into the filter tank 10 through the fluid supply pipe 135 may be greatly in excess of the amount of fluid which it is desired to divert therefrom and filter, and in such case as soon as the liquid level 270 ceases to rise due to the collection of gas thereabove, the excess fluid will flow through the fluid inlet pipe 152 and the inlet passage 153 into the fluid inlet chamber 148 of the back pressure valve means 140. As the fluid fills the fluid inlet chamber 148, it flows through the pressure passage 246, also filling the pilot valve chamber 151, and flows through the longitudinal slot 258 in the valve element 257, through the lateral opening 242, the passage 243, the hole 244, and the passage 245 into the fluid pressure chamber 219. The coil spring 226 exerts sufficient pressure on the outer clamp member 223 to prevent the major diaphragm from moving to the right, as seen in Fig. 6, while the fluid pressure chamber 219 is filling with fluid under pressure. It will thus be seen that the fluid pressures acting on the major diaphragm 218 quickly equalize, and the diaphragm does not move.

The pilot valve 160 is provided to permit the main valve 159 to open automatically when the fluid pressure in the fluid inlet chamber 148 exceeds a predetermined figure, and permits the main valve to close automatically when such pressure drops below a predetermined figure. The compression spring 260 may be adjusted to exert any desired force on the minor diaphragm unit 256 to tend to prevent the pilot valve 160 from opening, but as soon as the fluid pressure in the pilot valve chamber 151 exceeds such force, the minor diaphragm unit will move upwardly, unseating the valve element 257, to open the pilot valve. As soon as the pilot valve 160 opens, fluid in the fluid pressure chamber 219 exhausts through the passage 245, the hole 244, the passage 243, the lateral opening 242, the bore 241, and the pilot opening 238 into the fluid discharge chamber 150. Although there is a slight exhaust flow from the pilot valve chamber 151 and the fluid inlet chamber 148 through the longitudinal slot 258, this flow is less than the flow from the pressure chamber 219, and, accordingly, the fluid pressure in the fluid pressure chamber drops considerably more than the fluid pressure in the inlet chamber, which sets up an unbalanced force on the major diaphragm 218 causing the major diaphragm to move to the right, as seen in Fig. 6. Such rightward movement of the major diaphragm 218 unseats the main valve head 213, permitting fluid in the fluid inlet chamber 148 to flow into the fluid discharge chamber 150 and exhaust therefrom through the production flow pipe 154.

Fluid discharges through the main valve 159 from the fluid inlet chamber 148 into the fluid discharge chamber 150 until the fluid pressure in the inlet chamber and in the pilot valve chamber 151 drops below the compressive force exerted by the compression spring 260, at which time the compression spring causes the minor diaphragm unit 256 to move downwardly to seat the valve element 257 and close the pilot valve 160. Upon closure of the pilot valve 160, the fluid pressure in the pressure chamber 219 again equalizes the fluid pressure in the fluid inlet chamber 148, and the coil spring 226 causes the major diaphragm 218 to move to the left, as seen in Fig. 6, to close the main valve 159. It will thus be understood that the operation of the main valve 159 is automatic, but that the valve only opens when the fluid pressure in the fluid inlet chamber, and consequently the fluid pressure in the lower chamber 18 of the filter tank 10, increases above a predetermined pressure, or, conversely, that the back pressure valve means 140 maintains the fluid pressure in the filter tank above a predetermined minimum and below a predetermined maximum which is desirable in the operation of the filter.

The main valve 159 may be manually actuated by opening the bleeder valve member 230 by rotation thereof by the manual application of a suitable socket wrench, permitting fluid in the fluid pressure chamber 219 to exhaust through the passage 229, which unbalances the fluid pressures on the major diaphragm 218, causing it to open the main valve. Thus, the main valve 159 may be opened, without disturbing the setting of the pilot valve 160, when it is desired to test the movement of the main valve or to dislodge foreign matter that may accumulate therearound. It will also be understood that when the main valve 159 opens, fluid in the fluid inlet chamber 148 discharges therethrough by way of the passage 210 in the tubular member 209. Due to the fact that the tubular member 209 extends to a point near the bottom of the fluid inlet chamber 148, any accumulation of foreign matter in the bottom of the chamber will be carried up and out of the chamber by the fluid when the main valve opens, thus affording means for automatically cleaning the chamber.

As gas collects in the filter tank 10, the liquid level 270 will move downwardly in the lower chamber, and it is an important feature of my invention to provide means for releasing a predetermined quantity of such gas when the liquid level reaches a low point just above the valve mechanism 115. As the liquid level 270 drops, the ball float 165 also drops, causing the rod 166 to rotate the cylindrical section 167 in a counter-clockwise direction in the opening 169 of the boss 170. When the cylindrical section 167 is rotated sufficiently, the transverse horizontal slot 168 registers with the upper passage 175, permitting gas to flow from the lower chamber 18 through the opening 180, the transverse slot 168, the upper passage 175, the vertical passage 176, and the lower passage 177 into the gas inlet chamber 147.

If it is desired to collect the gas separately from the fluid discharging through the production flow pipe 154, the gas discharge valve means 157 is closed, and the gas storage valve means 158 is opened, permitting gas to flow from the gas inlet chamber 147 into the gas discharge chamber 149 and thence through the opening 200 into the gas storage pipe 271 joining therewith to a point of gas storage, not shown. If no gas storage facilities are available, or if it is not desired to separate the gas from the production flow, the gas discharge valve means 157 is opened and the gas storage valve means 158 is closed, thus permitting gas to flow from the gas inlet chamber 147 directly into the fluid discharge chamber 150, where it mixes with fluid therein and passes out of the back pressure valve means 140 through the production flow pipe 154 with such fluid. It will thus be understood that my invention provides means for separating gas from the fluid being treated.

Frequently, when the invention is used in treating the production flow from an oil well, the gas content of the oil being treated will decrease considerably, causing the liquid level 270 in the filter tank to rise. It is important that the liquid level 270 be maintained below the lower baffle 15, and accordingly I provide means for permitting gas to be put into the filter tank 10 when the amount of gas therein falls below a predetermined amount. When the amount of gas in the filter tank 10 decreases, the fluid level 270 rises, carrying with it the ball float 165 which causes the rod 166 to rotate the cylindrical section 167 in a clockwise direction in the boss 170 until the transverse horizontal slot 168 registers with the central passage 178 communicating with the orifice 179. The orifice 179 extends through the valve housing 145 and is connected to a gas inlet pipe 272 which leads to a suitable source of gas supply, not shown. As soon as the amount of gas in the chamber is augmented sufficiently to cause the fluid level 270 and the ball float 165 to drop, the cylindrical section 167 rotates in a counter-clockwise direction until the transverse slot 168 is out of registry with the central passage 178, at which time the gas-in supply is automatically cut off.

Further treatment of the fluid is effected by the lower chamber 18 of the filter tank 10 which acts as a settling tank, permitting solid particles of foreign matter to separate out and gravitate to the bottom of the chamber. Due to the fact that the fluid inlet pipe 152 extends to a point adjacent the bottom of the lower chamber 18, most of the settled particles of foreign matter in the bottom of the chamber will be carried out of the chamber through the pipe and through the back pressure valve means 140, thus effecting an automatic cleaning of the chamber. It will also be noted that this settling action in the tank 10 occurs prior to treatment in the filter element 45.

I claim as my invention:

1. In a centrifugal filter device, the combination of: filter means having walls defining a filter space; a filter element in said filter space; means for delivering a fluid to be filtered to said filter space; power means for rotating said filter means so as to filter said fluid; means for energizing said power means; valve means providing a passage communicating between said filter space and the exterior of said filter means when said valve is open; and means connected between said power means and said valve means and operative in response to a decrease in rotational speed of said power means relative to said filter means to open said valve means.

2. In a centrifugal filter device, the combination of: filter means having walls defining a filter space; a filter element in said filter space; means for delivering a fluid to be filtered to said filter space; power means for rotating said filter means so as to filter said fluid; valve means providing a passage communicating between said filter space and the exterior of said filter means when said valve is open; means connected between said power means and said valve means and operative in response to a decrease in rotational speed of said power means relative to said filter means to open said valve means; and timing means for periodically decreasing the rotational speed of said power means relative to that of said filter means.

3. In a centrifugal filter device, the combination of: filter means having walls defining a filter bed; means for delivering a fluid to be filtered to said filter bed; power means for rotating said filter means so as to filter said fluid; a valve member having a valve opening communicating between said filter bed and the exterior of said filter means; a valve head adapted to close said valve opening, said valve head when in a closed position preventing relative rotation between said power means and said filter means, said valve head when in an open position permitting relative rotation between said power means and said filter means; and means for moving said valve head from closed to open position in response to a decrease in rotational speed of said power means relative to the rotational speed of said filter means.

4. In a centrifugal filter device, the combination of: filter means having walls defining a filter bed; means for delivering a fluid to be filtered to said filter bed; power means for rotating said filter means so as to filter said fluid; a valve member having a valve opening communicating between said filter bed and the exterior of said filter means; a valve head adapted to close said valve opening, said valve head when in a closed position preventing relative rotation between said power means and said filter means, said valve head when in an open position permitting relative rotation between said power means and said filter means; and means for moving said valve head from open to closed position in response to an increase in rotational speed of said power means relative to the rotational speed of said filter means.

5. In a device of the character described, the combination of: a rotatable member having a fluid space therein; means for delivering fluid to said fluid space; rotatable power means for rotating said member; valve means providing a passage communicating between said fluid space and the exterior of said member when said valve means is open; and means connected between said power means and said valve means and operative in response to a decrease in rotational speed of said power means relative to said member to open said valve means.

6. In a device of the character described, the combination of: a rotatable member having a fluid space therein; means for delivering fluid to said fluid space; rotatable power means for rotating said member; valve means providing a passage communicating between said fluid space and the exterior of said member when said valve means is open; means connected between said power means and said valve means and operative in response to a decrease in rotational speed of said power means relative to said member to open said valve means; and timing means for periodically decreasing the rotational speed of said power means relative to said member.

7. In a device of the character described, the combination of: a rotatable member having a fluid space therein; means for delivering a fluid to said fluid space; rotatable power means for rotating said member; a valve member having a valve opening communicating between said fluid space and the exterior of said member; a valve head adapted to close said valve opening, said valve head when in a closed position preventing relative rotation between said power means and said member, said valve head when in an open position permitting relative rotation between said power means and said member; and means for moving said valve head from closed to open position in response to a decrease in rotational speed of said power means relative to the rotational speed of said member.

8. In a device of the character described, the combination of: a rotatable member having a fluid space therein; means for delivering a fluid to said fluid space; rotatable power means for rotating said member; a valve member having a valve opening communicating between said fluid space and the exterior of said member; a valve head adapted to close said valve opening, said valve head when in a closed position preventing relative rotation between said power means and said member, said valve head when in an open position permitting relative rotation between said power means and said member; and means for moving said valve head from open to closed position in response to an increase in rotational speed of said power means relative to the rotational speed of said member.

9. In a centrifugal filter device, the combination of: rotatable filter means having walls forming a filter space; means for delivering fluid to be filtered to said space; a filter bed element in said filter space, comprised of a plurality of layers, each of said layers having a plurality of holes therein, said holes being spaced apart a distance such that the angle of repose of filtered foreign materials adhering to said layers between said holes will cause the excess of said materials to pass through said holes without obstructing the spaces between adjoining layers; and power means for rotating said element so as to pass said fluid through said filter bed element to filter it.

10. In a centrifugal filter device, the combination of: rotatable filter means having walls forming a filter space; means for delivering fluid to be filtered to said filter space; a filter bed element in said filter space, comprised of a plurality of adjacent metallic layers, each of said layers having a plurality of holes therein, a substantial number of the holes of each of said layers being in staggered relation to the holes of each of the adjoining layers, so as to provide a tortuous fluid passage through said filter bed element; and power means for rotating said element so as to pass said fluid through said filter bed element to filter it.

11. In a centrifugal filter device, the combination of: rotatable filter means having walls forming a filter space; means for delivering a fluid to be filtered to said filter space; a filter bed element in said filter space, comprised of a plurality of adjacent layers, the distance between adjoining layers measured parallel to the lines of centrifugal force being small so that the clarifying capacity of said filter bed element is high without the use of a large centrifugal force; and power means for rotating said element so as to produce said centrifugal force to pass said fluid through said filter bed element to filter it.

12. In a centrifugal filter device, the combination of: rotatable filter means having walls forming a filter space; means for delivering fluid to be filtered to said filter space; a filter bed element in said filter space, comprised of a spirally formed metallic sheet having a plurality of holes therein, the adjoining layers of said sheet being spaced apart; and power means for rotating said element so as to pass said fluid through said filter bed element to filter it.

CLARENCE J. COBERLY.